(12) United States Patent
Deane et al.

(10) Patent No.: US 6,278,702 B1
(45) Date of Patent: Aug. 21, 2001

(54) METHOD FOR LIMITING THE DYNAMIC RANGE OF A CDMA SIGNAL

(75) Inventors: Peter Michael Deane, Fitzroy Harbour; Paul Newson, Kanata, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/203,048

(22) Filed: Dec. 2, 1998

(51) Int. Cl.[7] .................................................. H04J 13/02
(52) U.S. Cl. ........................ 370/342; 370/209; 370/441
(58) Field of Search ................................. 370/208, 209, 370/252, 335, 342, 441, 479; 375/130, 140, 141, 142, 145, 146, 147, 148

(56) References Cited

U.S. PATENT DOCUMENTS

| | | | |
|---|---|---|---|
| 4,001,564 | * 1/1977 | Bied-Charreton et al. | 370/342 |
| 5,566,201 | * 10/1996 | Ostman | 370/342 |
| 5,799,010 | * 8/1998 | Lomp et al. | 370/335 |
| 6,173,006 | * 1/2001 | Kent et al. | 375/145 |

* cited by examiner

*Primary Examiner*—Ricky Ngo

(57) ABSTRACT

The invention is a method and system for reducing the dynamic range of a signal input to a power amplifier in a CDMA forward-link transmission system. This is achieved by introducing a controllable amount of code-domain distortion to the data prior to spreading by Walsh codes. The amount of distortion is calculated by creating a data vector, applying a transform to the data vector to obtain a sequence, distorting the result to obtain a distorted sequence, applying an inverse transform to the distorted sequence to obtain a distorted data vector and comparing the distorted data vector to the original data, thereby to obtain the amount of code-domain distortion to be added to the data. The resultant, "corrected" spread-spectrum waveform can be controlled to the extent that it is guaranteed never to exceed a prescribed voltage range.

37 Claims, 7 Drawing Sheets

US 6,278,702 B1

METHOD FOR LIMITING THE DYNAMIC RANGE OF A CDMA SIGNAL

FIELD OF THE INVENTION

The present invention relates to spread-spectrum communications systems in general and, in particular, to a method and apparatus for reducing the dynamic range of a CDMA signal delivered to a base station power amplifier.

BACKGROUND OF THE INVENTION

In a typical wireless communications system, a base station communicates with a plurality of mobile stations over a wireless electromagnetic link operating in an allocated frequency range. In the case of a code-division multiple-access (CDMA) spread-spectrum system, such as that defined by ANSI standard J-STD-008 or TIA/EIA standard IS-95A, which are incorporated by reference herein, the allocated frequency range is divided into CDMA channels of width 1.23 MHz. Each CDMA channel is further split up into 64 code channels sharing the entire 1.23 MHz bandwidth of the CDMA channel, each code channel being associated with a respective one of a set of 64 mutually orthogonal spreading codes, hence the term "code division".

Each mobile station in the system is assigned one of the 64 code channels, along with a CDMA channel which it may share with other mobile stations having been assigned this same 1.23 MHz CDMA channel but other code channels. Therefore, in theory, up to 64 mobile stations can share the same CDMA channel. In practice, however, several reserved code channels may be occupied by a pilot channel, a sync channel and up to seven paging channels, allowing at least 55 (and up to 61) mobile stations to share the same 1.23 MHz CDMA channel. Incidentally, a code channel occupied by a mobile station is known as a "traffic" channel in the IS-95A specification and as a "fundamental" channel in the IS-95B specification.

In the forward (base-station-to-mobile-station) direction, a base station "spreads" the data destined for a particular mobile station by, e.g., multiplying it with the spreading code associated with the code channel assigned to the mobile station in question. Usually, the spreading code is a specially selected bit sequence having a rate that is much higher than the rate of the data. The spread data destined for many different mobile stations is combined, converted to analog form, modulated about a high-frequency carrier (to bring it within the frequency range of the appropriate CDMA channel) and finally amplified by a power amplifier prior to transmission by an antenna at the base station.

At each mobile station, the received signal in the assigned CDMA channel contains the spread data destined for it and for up to 54 or even 60 other mobile stations. However, because the spreading codes are mutually orthogonal, it becomes straightforward for the mobile station to isolate the code channel carrying the data spread by a single spreading code, and hence to recover the data contained therein.

Naturally, it is important to transmit the signal in any given 1.23 MHz CDMA channel at a sufficiently high power and with sufficient fidelity to enable good reception by all mobile stations sharing that CDMA channel. Thus, there are strict requirements to be met by the base station amplifier, which is consequently one of the more expensive components of the base station.

For example, considering the signal intended to be transmitted in a particular 1.23 MHz CDMA channel, TIA/EIA standard IS-95A imposes strict limits on the amount of power which is allowed to exist in neighbouring CDMA channels. By limiting the amount of allowable "spillover", this effectively imposes a requirement for high linearity on the part of the base station power amplifier. It is to be understood that the expressions "in-band distortion" and "out-of-band distortion" hereinafter refer to distortion within the intended 1.23 MHz CDMA channel and outside the intended 1.23 MHz CDMA channel, respectively.

In a dynamic scenario, as more and more mobile stations are accommodated by the base station, the agglomeration of the individual spread data signals leads to a progressively more random waveform for the composite signal input to the power amplifier, effectively taking on a Gaussian probability density function (pdf) centered about zero volts. In order to keep the out-of-band distortion to a minimum, extreme voltage values, although rare due to the Gaussian pdf, must be guaranteed to fall within the operating range of the power amplifier. That is to say, the dynamic range required of the power amplifier is related to the maximum voltage swing of the composite spread-spectrum waveform.

Unfortunately, the cost of a power amplifier increases dramatically with the input voltage range over which it is required to operate. Therefore, it is of interest to keep the input voltage range relatively low, i.e., to limit the range of the composite waveform created by the multiple spread data signals. Clearly, other than employing a more costly power amplifier with a higher input voltage rating, one solution for limiting the range of the composite waveform is to correspondingly limit the number of users sharing the 1.23 MHz CDMA channel.

However, if there is a high density of mobile stations in a particular area, then the maximum permitted number of users in a given CDMA channel may easily be exceeded, requiring the use of additional CDMA channels or even base stations, which is a costly option for the telecommunications service provider. This and other prior art solutions are evidently inefficient, since they lead to a substantial investment for handling the occasional, although natural occurrence of high peak voltages as the number of users increases.

SUMMARY OF THE INVENTION

It is an object of the present invention to mitigate or obviate one or more disadvantages of the prior art.

Therefore, the invention may be summarized according to a first broad aspect as a system for modifying a plurality of input data streams entering a CDMA forward link having means for spectrally spreading the plurality of input data streams in accordance with a plurality of spreading codes, thereby to produce a respective plurality of spread data streams, and means for combining, modulating and heterodyning the plurality of spread data streams, thereby to produce a composite signal having a dynamic range, the system comprising: means for computing a plurality of correction factors from the plurality of input data streams; and means for varying the input data streams in accordance with the correction factors; wherein the correction factors take on values that limit the dynamic range of the composite signal.

The invention may be summarized according to a second broad aspect as a system for producing a composite signal from a plurality of input data streams, the composite signal having a dynamic range, the system comprising: means for varying the input data streams in accordance with a plurality of correction factors and producing a respective plurality of modified data streams; means for spectrally spreading the plurality of modified data streams in accordance with a plurality of spreading codes, thereby to produce a respective plurality of spread data streams; means for modulating, heterodyning and combining the plurality of spread data streams, thereby to produce the composite signal; and means for computing the plurality of correction factors from the plurality of input data streams, wherein the correction factors take on values that limit the dynamic range of the composite signal.

According to a third broad aspect, the invention may be summarized as a method of modifying a plurality of input data streams entering a CDMA forward link having means for spectrally spreading the plurality of input data streams in accordance with a plurality of spreading codes, thereby to produce a respective plurality of spread data streams, and means for combining, modulating and heterodyning the plurality of spread data streams, thereby to produce a composite signal having a dynamic range, the method comprising the steps of: computing a plurality of correction factors from the plurality of input data streams; and varying the input data streams in accordance with the correction factors; wherein the correction factors take on values that limit the dynamic range of the composite signal.

According to a fourth broad aspect, the invention may be summarized as a method for producing a composite signal from a plurality of input data streams, the composite signal having a dynamic range, the method comprising the steps of: varying the input data streams in accordance with a plurality of correction factors and producing a respective plurality of modified data streams; spectrally spreading the plurality of modified data streams in accordance with a plurality of spreading codes, thereby to produce a respective plurality of spread data streams; modulating, heterodyning and combining the plurality of spread data streams, thereby to produce the composite signal; and computing the plurality of correction factors from the plurality of input data streams, wherein the correction factors take on values that limit the dynamic range of the composite signal.

The invention may be summarized according to a fifth broad aspect as a computer-readable storage medium containing software that, when running on a processor, follows a sequence of steps to produce a plurality of correction factors for respectively varying a plurality of input data streams that are fed to a CDMA forward link having means for spectrally spreading the plurality of input data streams in accordance with a plurality of spreading codes, thereby to produce a respective plurality of spread data streams and means for modulating, heterodyning and combining the plurality of spread data streams, thereby to produce a composite signal having a dynamic range, the steps comprising: periodically storing the instantaneous values of the input data streams; applying a transform to said instantaneous values, thereby to produce a first time sequence; applying a distortion model to the first time sequence, thereby to produce a second time sequence; inversely applying said transform to the second time sequence, thereby to produce distorted instantaneous values; and setting each correction factor to a value that is a function of the difference between the respective instantaneous and distorted instantaneous values; wherein modification of the input data streams by the correction factors reduces the dynamic range of the composite signal.

According to a sixth broad aspect, the invention may be summarized as a computer-readable storage medium containing software that, when running on a processor, follows a sequence of steps to produce a plurality of correction factors for respectively varying a plurality of input data streams that are fed to a CDMA forward link having means for spectrally spreading the plurality of input data streams in accordance with a plurality of spreading codes, thereby to produce a respective plurality of spread data streams and means for modulating, heterodyning and combining the plurality of spread data streams, thereby to produce a composite signal having a dynamic range, the steps comprising: periodically storing the instantaneous values of the input data streams; collectively comparing said instantaneous values to a plurality of table entries, each table entry corresponding to a collection of instantaneous values that gives rise to high amplitude variations of the composite signal and being associated with a set of correction factors; if the instantaneous values collectively match one of the plurality of table entries, extracting from said table the set of correction factors corresponding to said table entry; otherwise setting the correction factors to respective default values.

BRIEF DESCRIPTION OF THE DRAWINGS

The preferred embodiment of the present invention will now be described with reference to the following figures, in which.

DETAILED DESCRIPTION OF THE PREFERRED EMBODIMENT

Figure 1:
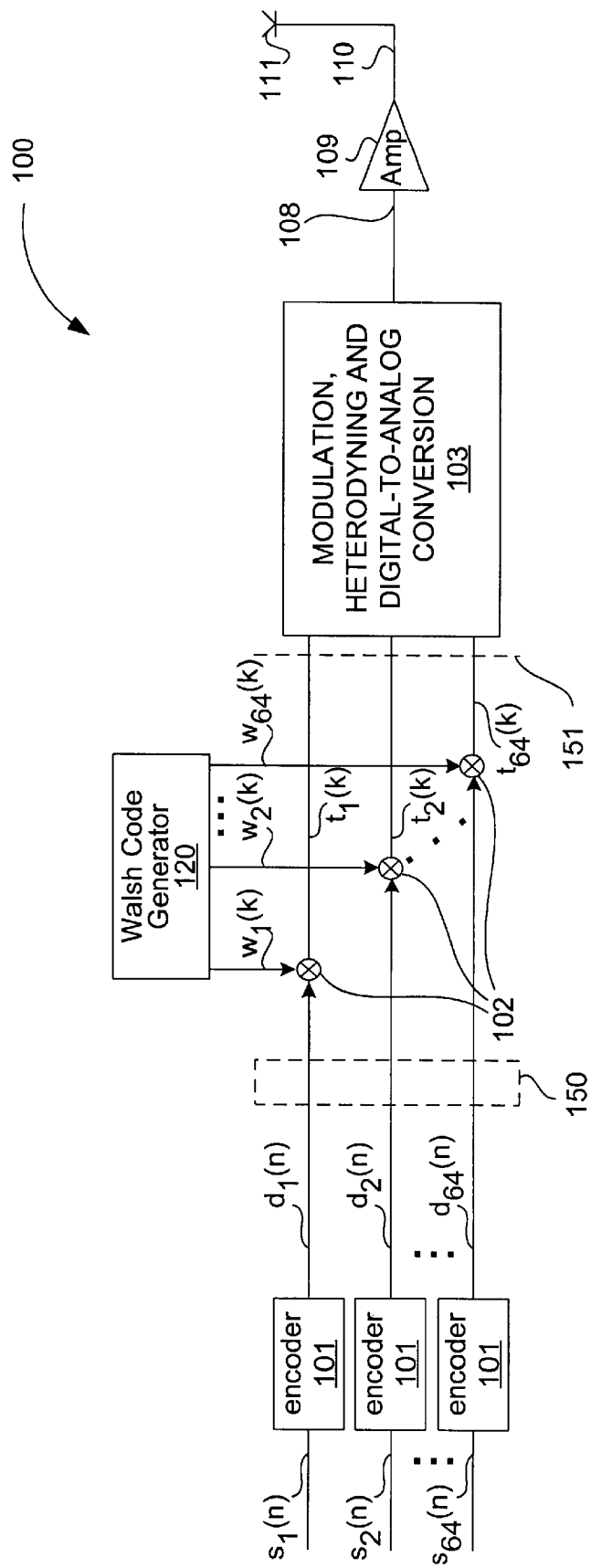
FIG. 1 is a block diagram of a CDMA forward-link transmission system in accordance with the prior art.

In FIG. 1 there is illustrated a CDMA forward-link transmission system 100 according to the prior art, providing multiple access for up to sixty-four individual traffic and overhead channels. Referring to n as a time variable, 64 data streams $s_i(n)$, $i \in \{1, \ldots, 64\}$ enter respective convolutional encoders 101, which generate respective encoded data streams $d_i(n)$, $i \in \{1, \ldots, 64\}$. In a telecommunications scenario, each data stream $s_i(n)$ associated with a traffic channel may carry vocoded speech destined for a respective mobile user at a rate of 9.6 kilobits per second (kbps). The numerical value of each element in a data stream $s_i(n)$ associated with a respective traffic channel is binary, being chosen from the set $\{-1,1\}$. For unused channels, the numerical value of each element in the associated data streams $s_i(n)$ is zero.

The convolutional encoders 101 improve robustness of the data streams $s_i(n)$ associated with the traffic channels by adding redundancy. Their use is well known in the art; in the IS-95A CDMA standard, for example, half-rate convolutional encoders are employed, producing encoded data streams at twice the input rate, i.e., the convolutional encoders have an output rate, known as the symbol rate, of 19.2 kbps. The encoders 101 are usually collocated in a digital signal processor (DSP) forming part of the transmission system 100. The convolutional encoders 101 do not affect the functionality of the present invention, but are included here for compliance with TIA/EIA standard IS-95A or ANSI standard J-STD-008. In some instances, the forward-link transmission system 100 may comprise additional processing elements for symbol repetition and block interleaving immediately subsequent to convolutional encoding, although these are not essential to explaining the functioning of the present invention, and therefore have been omitted from FIG. 1.

The encoded data streams $d_i(n)$ at 19.2 kbps emerge on signal lines connecting the encoders 101 to respective multipliers 102, where the encoded data streams $d_i(n)$ are multiplied by respective Walsh codes $w_i(k)$, thereby creating respective individual spread spectrum signals $t_1(k), \ldots, t_{64}(k)$. The Walsh codes $w_i(k)$, $i \in \{1, \ldots, 64\}$ each have a common rate, known as the chip rate, that is usually higher than the symbol rate. For example, in IS-95A CDMA, the symbol rate is 19.2 kbps and the chip rate is 1228.8 kbps. The time variables n and k respectively represent the symbol period and the chip period which are typically in a ratio of 64:1, or approximately 52 microseconds to approximately 814 nanoseconds.

The Walsh codes $w_i(k)$ originate in a Walsh code generator 120 that produces up to sixty-four such codes (depending on the number of active users) at the chip rate. The Walsh code generator 120 is typically a digital signal processor running an algorithm for the generation of Walsh codes according to a known mathematical formula. The Walsh code generator 120 is synchronized with the symbol rate and produces, between successive symbol intervals, sixty-four periodic binary-valued (−1 and 1) Walsh codes $w_1(k), \ldots w_{64}(k)$, each having a length of 64 chips.

Because the Walsh codes $w_i(k)$ are generated at the chip rate, the multipliers 102 will also operate at this rate, each performing one multiplication every 814 nanoseconds (approximately). After having been multiplied by respective Walsh codes $w_i(k)$, the individual spread spectrum signals $t_i(k)$ follow the classical steps of signal addition, pulse shaping, pseudonoise spreading, heterodyning, modulation and digital-to-analog conversion (in a suitable order), which are shown as being performed by a generic signal conditioning block 103. The resultant modulated and heterodyned analog spread spectrum signal, or simply "composite analog signal" 108 is fed to a power amplifier 109, which then generates an amplified signal 110 that is transmitted to remote mobile stations (not shown) by an antenna 111.

The prior art transmission system 100 is afflicted with serious disadvantages arising from large signal amplitudes being fed to the power amplifier 109. These drawbacks can best be understood by first considering in detail how the prior art system functions. Thus, with continued reference to FIG. 1, between symbol times $n_0$ and $n_0+1$, each of the instantaneous values $d_i(n_0)$ from the encoded data streams $d_i(n)$ is sequentially multiplied ("spread") by all sixty-four values of the associated Walsh code $w_i(64n_0), \ldots, w_i(64n_0+63)$, producing sixty-four individual spread spectrum signal sequences $t_i(k)$, each of length 64.

Within each symbol interval, the 64 sequences $t_i(k)$, each of length 64, will pass through the signal conditioning block 103, which applies quadrature and carrier modulation in addition to digital-to-analog conversion, thereby to yield the resultant composite analog signal 108.

It is noted that modulation is a linear operation. Therefore, in order to examine the behaviour of the amplitude swings of the composite analog signal 108, it is suitable to instead analyze the amplitude variations of a composite digital signal formed at 151 by component-wise addition of the sixty-four spread-spectrum signal sequences $t_i(k)$. The resultant sample sequence, denoted p(k), represents a composite digital signal whose amplitude variations are directly proportional to the amplitude variations experienced at the input to the power amplifier 109, assuming distortionless digital-to-analog conversion and carrier modulation by the signal conditioning block 103.

Figure 2A:
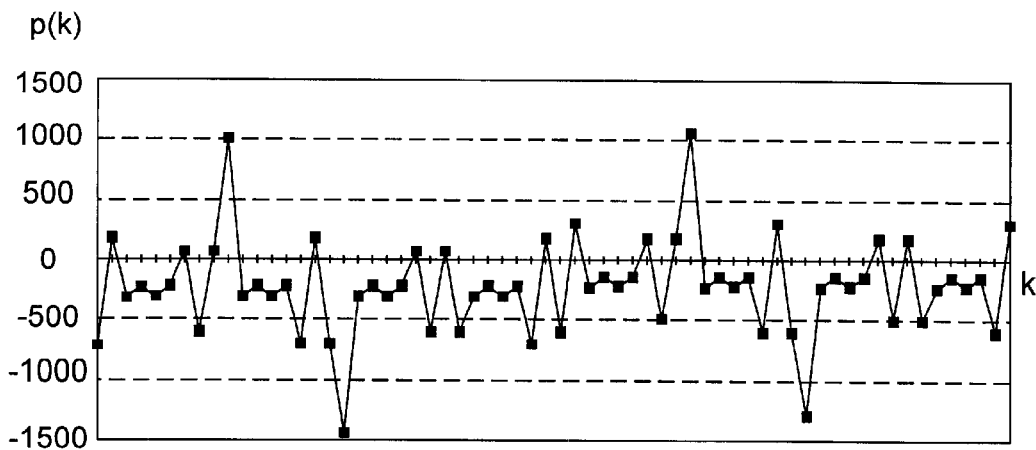
FIGS. 2A and 2B respectively illustrate clean and distorted time-domain waveforms.

FIG. 2A shows the sequence p(k) resulting from a summation of the 64 individual spread spectrum signal sequences $t_i(k)$, which, as already described, were themselves created by multiplying the instantaneous values $d_i(n_0)$ of the encoded data streams $d_i(n)$ with respective Walsh codes $w_i(k)$. For explanatory purposes, channels 9 through 24 have been chosen as traffic channels, the remaining channels remaining unused, although it is to be considered that in a system compliant with IS-95A or ANSI J-STD-008, a pilot channel would be present at channel 1, a sync channel may be present at channel 33, paging channels may be present at channels 2 through 8 and there would be an arbitrary number of traffic channels distributed among channels 8 through 31 and 33 through 63.

Example values for the encoded data streams $d_i(n)$ on traffic channels 9 through 24 may be chosen as follows:

$0, i \in \{1,2, \ldots, 7,8,25,26, \ldots, 63,64\}$ $d_i(n_0) = 1, i \in \{9,11,12,13,14,15,18,20,22,24\}$ $-1, i \in \{10,16,17,19,21,23\}$.

Since the traffic channel data is time-varying, subsequent values of the encoded data streams $d_i(n_0+m)$, $i \in \{9, \ldots, 24\}$, $m = \{1,2, \ldots\}$ will alternate between −1 and 1 in a seemingly random manner, while the encoded data streams $d_i(n)$, $i \in \{1, \ldots, 8, 25, \ldots, 64\}$ will remain at value zero.

Although it is implied that Walsh code $w_1(k)$ is associated with modified data stream $d'_1(n)$ and so on, it is possible that particular Walsh codes will be associated with particular traffic channels. The assignment of specific "traffic codes" in this manner simply corresponds to a mathematical permutation of the Walsh codes that is executed by the Walsh code generator 120.

Mathematically, the sequence p(k) consists of applying a so-called Walsh-Hadamard operator (or "transform") $\mathcal{H}$ to the $d_i(n_0)$. This operation can be viewed as constructing a data vector $d(n_0) [d_0(n_0) d_1(n_0) \ldots d_{63}(n_0)]^T$ from the instantaneous values of the encoded data streams $d_i(n)$ at time $n_0$, then left-multiplying the data vector $d(n_0)$ by a Hadamard matrix to obtain a resultant column vector, whose elements are the individual samples in the sequence p(k).

It is clear from the plot of the sequence p(k) in FIG. 2A that a minority of points have a relatively large magnitude. (The occurrence of large amplitudes is actually far more rare than can be concluded from a single example of the sequence p(k) because the vast majority of combinations for the data vector $d(n_0)$ will not cause any significant swings in the resultant sequence p(k). It is to be considered, therefore, that the illustrated example has been purposefully and carefully chosen to demonstrate the occurrence of this rare event.)

Figure 2B:
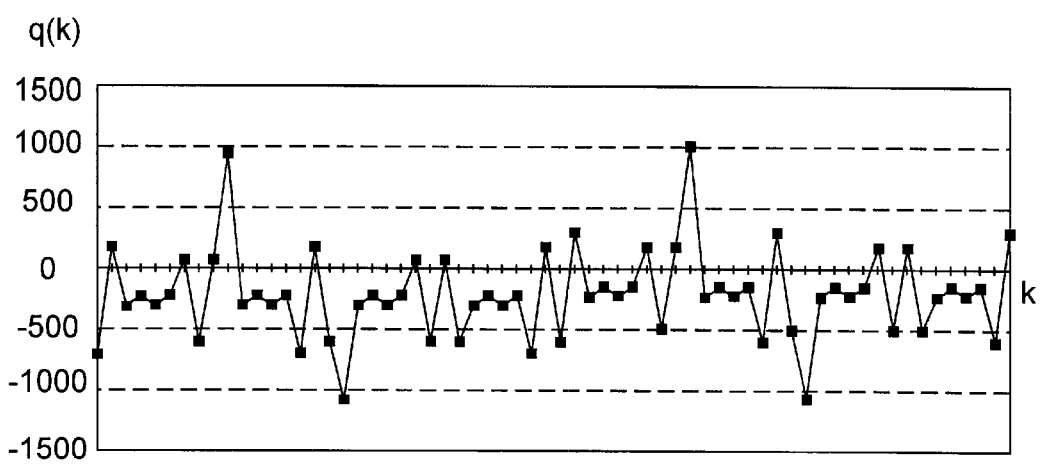

Recalling that the behaviour of the sequence p(k) is reflected in the behaviour of the composite analog signal 108, it is useful to examine the effects of amplifier distortion on the composite analog signal by considering similar distortion applied to the sequence p(k). With reference to FIG. 2B, the sequence p(k) is shown having undergone so-called cubic distortion, resulting in the distorted sequence q(k). Other types of distortion applied to the original sequence p(k) result in different distorted sequences q(k), but a common feature remains that the distorted sequence q(k) has a lesser peak voltage swing than the original sequence p(k). Such "clipping" by the power amplifier 109 leads to detrimental effects which are more clearly visible in the frequency and code domains.

Figure 3A:
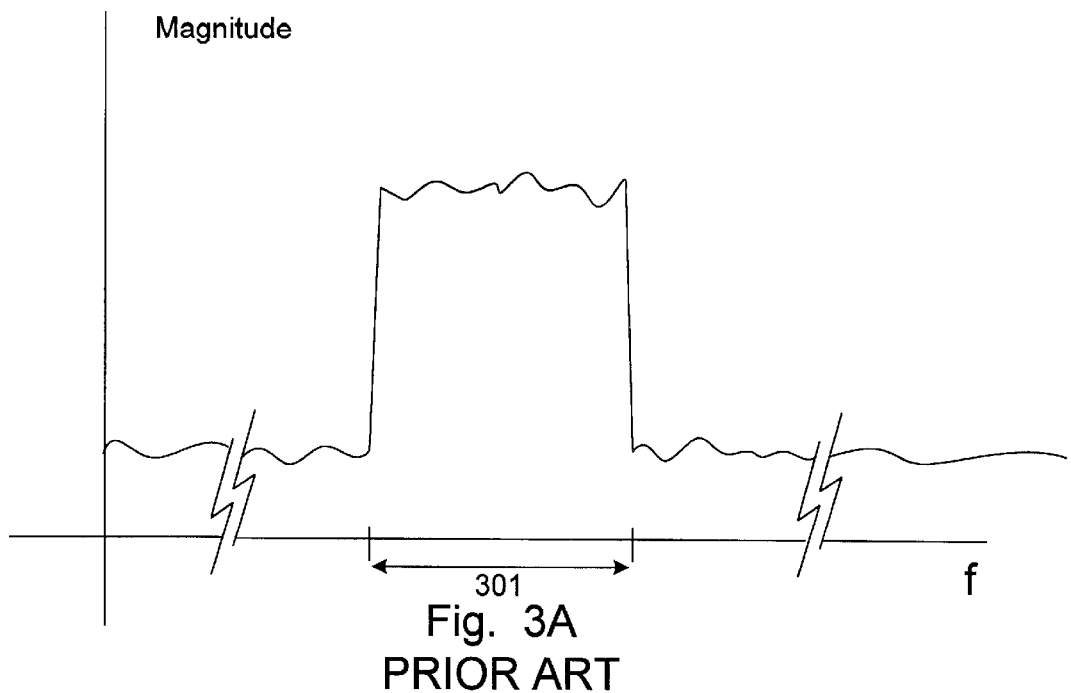
FIGS. 3A and 3B illustrate frequency-domain representations of the clean and distorted waveforms of FIGS. 2A and 2B, respectively.

In the frequency domain, consideration is given to the spectrum of the composite analog signal 108 instead of the sequence p(k), since it is customary to deal with the power spectral density of a fully modulated and heterodyned signal. Accordingly, reference is made to FIGS. 3A and 3B, which show, respectively, the frequency spectrum of a "clean" signal and that of a distorted signal having undergone amplifier clipping. Both comprise significant frequency content in a CDMA channel 301, but it is also evident that the distorted spectrum (FIG. 3B) possesses a fair amount of frequency content 302 outside the CDMA channel 301.

This additional unwanted frequency content 302, which is due to amplifier clipping, spills over into neighbouring CDMA channels and, in accordance with the convention adopted herein, is known as out-of-band distortion. In accordance with the IS-95A standard, the level of the out-of-band distortion 302 must be below a certain limit, from which it follows that power amplifier clipping is to be avoided as much as possible. In the prior art system of FIG. 1, this can be achieved by increasing the power rating of the power amplifier 109 or by reducing the number of users (traffic channels) sharing the allocated frequency band 301, both options being relatively expensive. Traditionally, system designers have been often forced into one of these expensive options by attempting to avoid what are actually relatively rare occurrences, i.e., exceptionally large signal swings at the input to the power amplifier 109 or, equivalently, extraordinarily large deviations from zero in the sequence p(k).

Figure 3B:
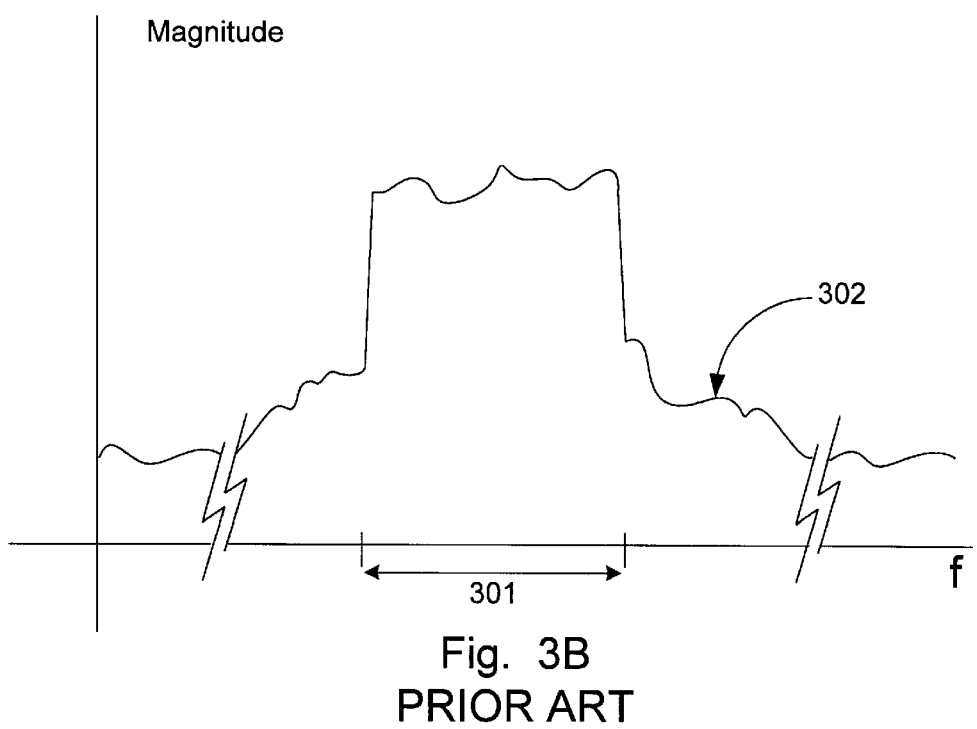

Also in FIG. 3B, a certain amount of so-called in-band distortion (as defined hereinabove) is visible as a difference in the two spectra within the CDMA channel 301, which is best analyzed in the code domain. An important code domain tool is the code domain power spectrum, which determines the amount of each Walsh code present in a given time sequence. The code domain power spectrum is obtained by first applying the inverse of the Walsh-Hadamard operator $\mathcal{H}$ to a given sequence and then taking the magnitude (or square magnitude) of the result. The inverse Walsh-Hadamard operator (or transform) $\mathcal{H}$ is easily obtained from the (ordinary) Walsh-Hadamard operator, as the two are related by a simple scaling factor.

Figure 4A:
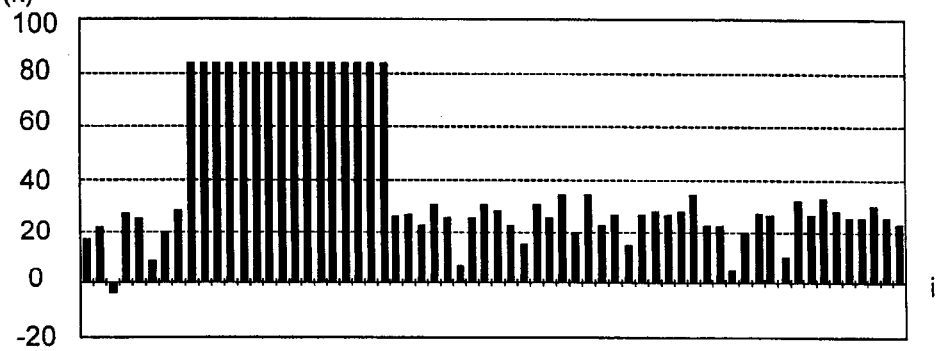
FIGS. 4A and 4B illustrate code-domain representations of the clean and distorted waveforms of FIGS. 2A and 2B, respectively.

Clearly, if there is no noise or distortion present in the sequence p(k) derived from transforming the data vector $d(n_0)$, then the inverse operations cancel each other and the code domain power spectrum of the sequence p(k) will be identical to the magnitude of the data vector $d(n_0)$. In FIG. 4A, which illustrates the code domain power spectrum of the sequence p(k), it is seen that the code domain power levels of the traffic codes $w_i(k)$, $i \in \{9,10, \ldots, 23,24\}$ are identical and dominate the code domain landscape. The power level of "spurious" codes, i.e., Walsh codes associated with unused channels, falls at least 50 dB below the level of the traffic 30 codes, indicating a relatively noise-free sequence p(k).

Figure 4B:
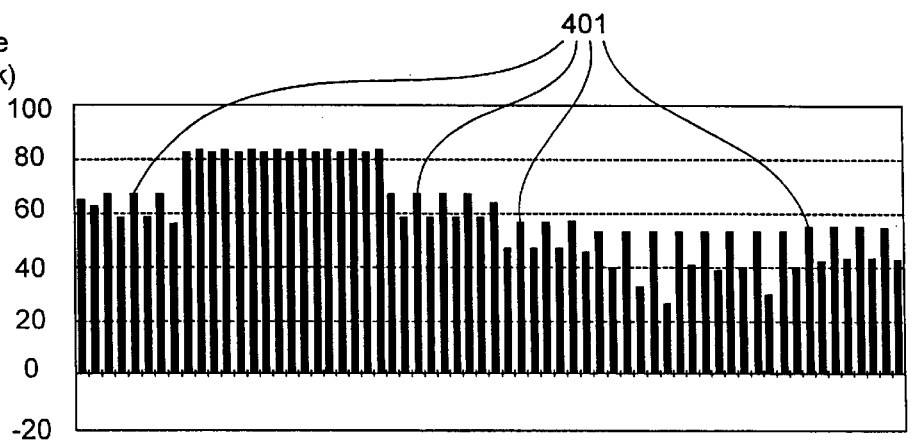

On the other hand, FIG. 4B shows the code domain power spectrum of a distorted sequence q(k) obtained from the "original" sequence p(k) by applying a cubic distortion function. The clipping effect of the power amplifier 109, resembling cubic (or higher-order) distortion, is evidenced by the appearance of relatively prominent spurious codes 401. Furthermore, the traffic codes $w_i(k)$, $i \in \{9,10, \ldots, 23,24\}$ are slightly altered in the amount of code power they contain. If the difference in the code power levels between the undistorted and distorted code power spectra is too great, i.e., if there is excessive in-band distortion, data errors may occur when the encoded data streams $d_i(n)$ are received, demodulated and subsequently decoded by the mobile terminals. The IS-95A standard accordingly provides a guideline for the amount of in-band (code domain) distortion that can reside in the transmitted signal. Usually, a certain amount of in-band distortion can be tolerated without resulting in corruption of the data intended to be transmitted.

From the above, it is clear that amplifier clipping results in distortion, both in-band and out-of-band, which affects the performance of the transmission system and may cause the system to be incompliant with TIA/EIA standard IS-95A or ANSI standard J-STD-008. In the present invention, a main objective is to significantly reduce the amount of out-of-band distortion (i.e., spillover into neighbouring CDMA channels) by adding a controllable amount of in-band distortion through "correction" of the encoded data streams $d_i(n)$. By anticipating large deviations in an internally generated version of the time sequence p(k), the occurrence of large signal swings in the composite analog signal 108 is averted, thereby permitting the use of power amplifiers with lower power ratings. At the same time, the encoded data streams $d_i(n)$ are only slightly perturbed so as not to lead to an unacceptable error rate upon decoding of the data by the destination mobile stations.

Figure 5:
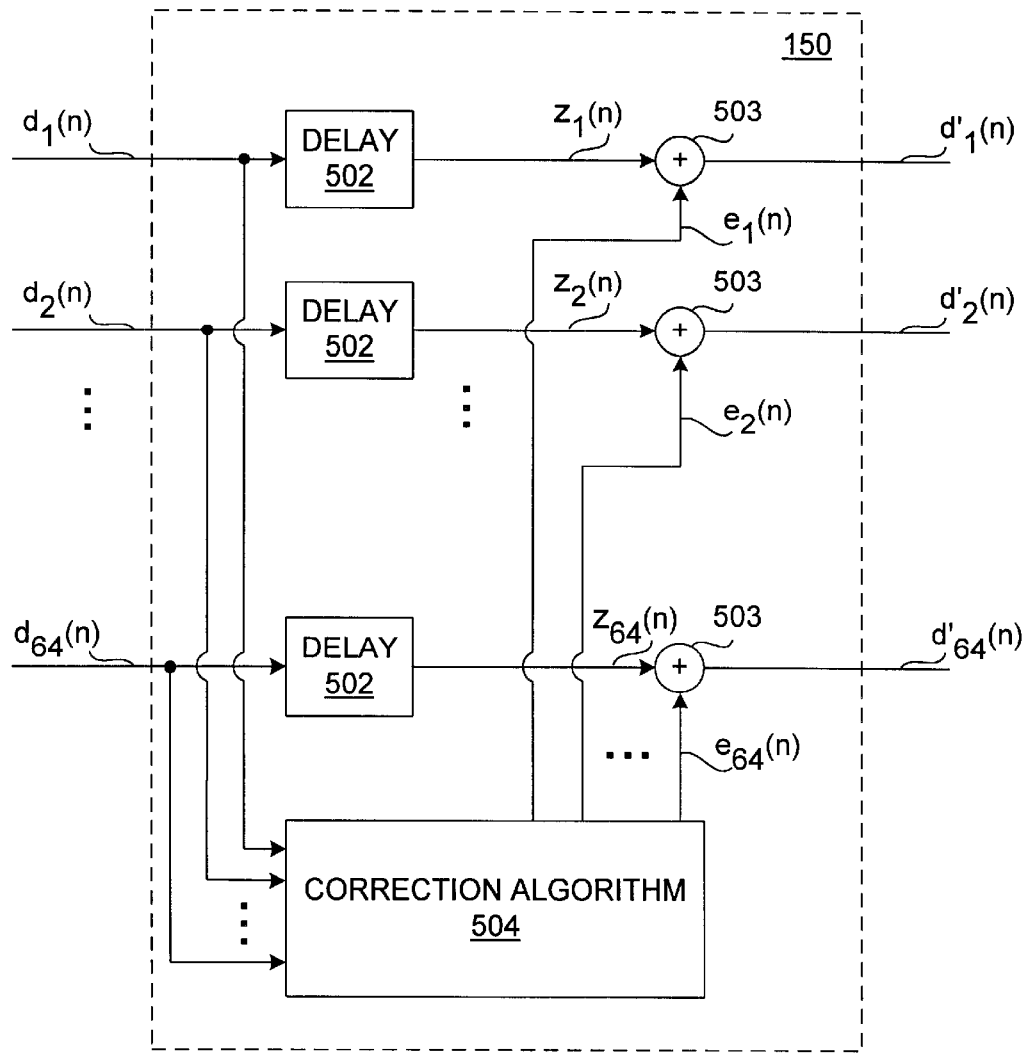
FIG. 5 is a block diagram of an improvement to be added to the system in FIG. 1 in accordance with the present invention.

In accordance with the present invention, therefore, FIG. 5 shows a processing block 150 to be inserted immediately after the encoders 101 in FIG. 1. The processing block 150 comprises a plurality of delay elements 502 for respectively accepting the encoded data streams $d_i(n)$ and producing respective delayed data streams $z_i(n)$. The encoded data streams $d_i(n)$ also lead to a correction algorithm 504, which could be implemented on a digital signal processor. The delayed data streams zi(n) lead to respective summers, which also accept respective correction factors $e_i(n)$ from the correction algorithm 504, resulting in respective modified data streams $d'_i(n)$.

As illustrated in FIG. 5, the invention may be implemented within an existing forward-link transmission system by intercepting and modifying the encoded data streams $d_i(n)$. In this case, the correction algorithm 504 may be collocated on the same digital signal processor which performs Walsh code generation. Alternatively, the invention may be implemented external to an existing forward-link transmission system by intercepting and modifying the original data streams $s_i(n)$ prior to their entry into the system.

In operation, the streams to be modified, in this case, encoded data streams $d_i(n)$, respectively enter the delay elements 502, where they are each delayed by one symbol period. Each delayed data stream $z_i(n)$, which is a delayed version of the corresponding encoded data stream $d_i(n)$, is corrected by the addition of a correction factor $e_i(n)$ at the corresponding summer 503. Having been "corrected", the modified data streams $d'_i(n)$ corresponding to traffic channels are no longer restricted to having values of either −1 or 1. Similarly, the modified data streams $d'_i(n)$ corresponding to unused channels are no longer necessarily of value zero.

A functional description of how the correction factors $e_i(n)$ are generated by the correction algorithm 504 is now provided with the aid of vector notation to represent the various signals in FIG. 5. For instance, it is convenient to view the multiple encoded data streams $d_i(n)$ as a time-varying data vector $d(n)=[d_1(n), d_2(n), \ldots, d_{64}(n)]^T$. Similarly, it is convenient to form a delayed data vector $z(n)$, a correction vector $e(n)$ and a modified data vector $d'(n)$.

Figure 6:
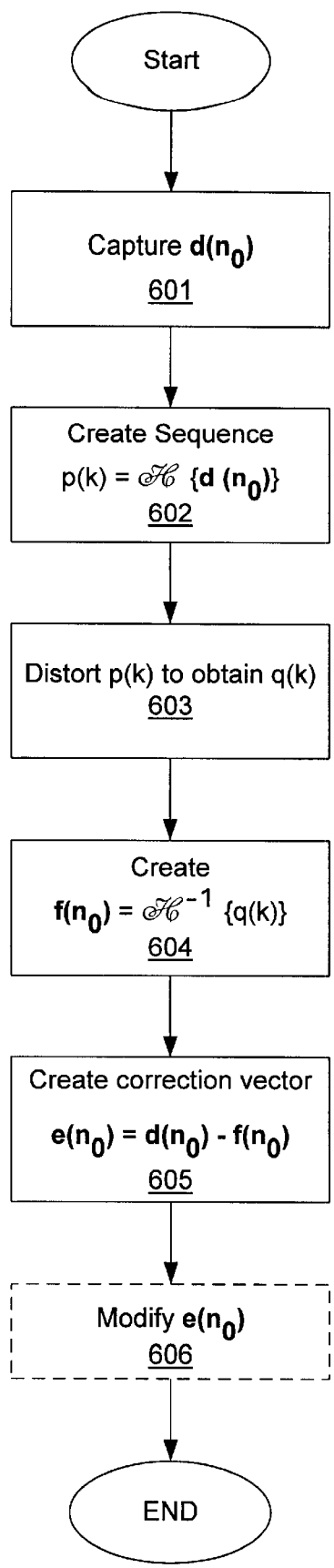
FIG. 6 is a flowchart describing the preferred mode of operation of the correction algorithm in the inventive system of FIG. 5.

Reference is now made to FIG. 6, which illustrates preferred operation of the correction algorithm 504.

Box 601: With no representing the current value of n, the correction algorithm 504 captures the current value of each of the encoded data signals $d_i(n_0)$, creating a data vector $d(n_0)$.

Box 602: The correction algorithm immediately generates a sequence $p(k)$, which can be achieved as previously described, i.e., by applying the Walsh-Hadamard operator $\mathcal{H}$ to the encoded data streams $d_i(n_0)$, $i \in \{1, \ldots, 64\}$, or by left-multiplying the data vector $d(n_0)$ with a Hadamard matrix. The Walsh-Hadamard transform is closely related to the discrete Fourier transform (DFT), and as such, there have been numerous signal processing algorithms devised to increase the computational efficiency of the transform, known as fast Hadamard transform (FHT) algorithms.

Box 603: The correction algorithm applies a preselected distortion function to the sequence $p(k)$ in order to generate a distorted sequence $q(k)$. An acceptable distortion model has been found to be a cubic function, which describes the shape of the input-output curve of the amplifier. Other odd powers, specific curve shapes or combinations thereof can be used to model the distortion induced by the amplifier, known as "soft clipping" or "soft limiting".

Incidentally, if the chosen distortion function accurately models the effect of the power amplifier 109, then distorted sequence $q(k)$ in this case will closely resemble the distorted sequence $q(k)$ already encountered in FIG. 2B.

Box 604: The inverse Walsh-Hadamard operator $\mathcal{H}^{-1}$ is applied to the distorted sequence $q(k)$ in order to obtain the code-domain representation of the distorted sequence. Specifically, this can be achieved by constructing a column vector with the distorted time sequence $q(k)$ and left-multiplying this vector with a Hadamard matrix to obtain a distorted data vector $f(n_0)$. The distorted data vector $f(n_0)$ is the code-domain representation of the distorted sequence $q(k)$ and, under conditions of distortion, will exhibit dissimilarities with respect to the data vector $d(n_0)$.

Box 605: The code-domain discrepancies are quantified by forming a correction vector $e(n_0)=d(n_0)-f(n_0)$. The individual elements of the correction vector $e(n_0)$ are the correction factors $e_i(n)$ to be respectively added to the delayed encoded data streams $z_i(n)=d_i(n-1)$ at time $n=n_0$. Since the modification of the encoded data streams occurs with a delay of one symbol period, it is preferable that the correction factors $e_i(n)$ be calculable within such an interval, i.e., it is desirable to execute boxes 601–605 within a symbol period.

It is clear that the modified data streams $d'_i(n)$ will contain a certain level of in-band distortion in the code domain that is introduced by the addition of the correction factors $e_i(n)$. Although this prevents the power amplifier 109 from introducing out-of-band distortion, too much code domain compensation may lead to severe problems when decoding the actual data bits. This is clearly indicative of the trade-off between the amount of in-band distortion that can be safely added while combatting out-of-band distortion.

Advantageously, the amount of code domain distortion that can be induced by the correction algorithm in the present invention is a controllable design parameter.

The correction algorithm illustrated in FIG. 6 may be enhanced by the addition of an optional step (box 606), which is devoted to modifying selected elements of the correction vector $e(n_0)$ prior to summation by the summers 503. The choice of which of the encoded data streams $d_i(n)$ are to be modified can be as straightforward as making no selection at all, i.e., applying a correction factor to all the encoded data streams (including any unused encoded data stream having value zero, but whose value will become nonzero after the addition of a nonzero correction factor thereto.)

On the other hand, it may be more practical to modify only those encoded data streams $d_i(n)$ that are associated with traffic channels. In this case, it becomes feasible to employ multipliers (instead of summers) in order to multiply the encoded data streams by respective correction factors (instead of performing an addition). In yet another variant, the correction algorithm may only apply corrections that either surpass or are below a certain threshold level. The recommended approach for selecting which encoded data streams to modify can depend on the objectives of cost, performance and complexity, to name a few, and it is left to individual system designer to make this choice.

It has been found that in most cases, the dynamic range of the composite analog signal 108 can be significantly reduced by adding a relatively small, tolerable amount of in-band distortion. Consequently, the power rating of the power amplifier 109 used in the inventive system can be reduced with virtually no loss in performance, which lowers the per-user cost of the base station.

While the preferred embodiment of the present invention has been described and illustrated, it will be apparent to one skilled in the art that numerous modifications and variations are possible. For example, there may be greater or fewer than 64 available channels in the system, depending on the required capacity, although the IS-95A standard limits this number to a maximum of 64. Moreover, as each active user is typically associated with only one traffic channel, a less-than-maximum number of users would leave a balance of unused channels. In the case where the number of traffic channels is less than the number of channels available, the present invention does not impose a specific ordering of the traffic channels among the available channels.

Furthermore, as discussed, it is not uncommon for several channels to be reserved as control, sync or paging channels. Nevertheless, for the purposes of describing this invention, such channels can be ignored or treated as additional traffic channels without any reduction in functionality. In addition, it is to be understood that while that the values for the symbol rate (19.2 kbps), the chip rate (1228.8 kbps), the ratio of chip rate to symbol rate (64:1), and the number of channels (64) have all been chosen in order to comply with TIA/EIA standard IS-95A, other values may be used without departing from the spirit of the present invention.

Moreover, it is possible to improve the computational efficiency of the correction algorithm 504. Since only a small minority of possible combinations of data vectors $d(n_0)$ will produce large deviations in the corresponding sequence $p(k)$ and amplifier composite analog signal 108, it is beneficial to store all such vectors, along with corresponding precalculated correction vectors $e$, in a look-up table. The correction vectors $e$ which populate the look-up table can be calculated ahead of time, for each data vector $d(n_0)$ that leads to significant signal deviations, using the method of FIG. 6 or one of its variants. An algorithm using such a look-up table approach is now described with reference to FIG. 7.

Box 701: A data vector $d(n_0)$ is formed at each symbol interval $n_0$ from the instantaneous values of the encoded data sequences $d_i(n)$.

Box 702: A look-up table containing selected data vectors and associated error vectors is searched. The search can be performed on the data vector $d(n_0)$ as a whole or possibly on the basis of only those elements of the data vector $d(n_0)$ that correspond to traffic channels.

Box 703: By consulting the look-up table, it is determined whether a vector equal to the data vector $d(n_0)$ or to a sub-vector consisting of the elements of $d(n_0)$ corresponding to traffic channels has been located. If searching the look-up table reveals a match for the data vector $d(n_0)$, then box 704 is entered. Otherwise, it may be concluded that no significant deviations will be present in the composite analog signal 108, and thus no correction is required to be applied to the encoded data streams $d_i(n)$.

Box 704: If a match for the data vector $d(n_0)$ has been found in the look-up table, then the corresponding correction vector e of correction factors $e_i$ for each encoded data stream $d_i(n)$ is extracted. Since the number and grouping of traffic channels is dynamic, an additional (optional) step may be undertaken at this point to modify the correction vector e so that only selected ones of the encoded data streams, e.g., those associated with traffic channels, are modified.

Figure 7:
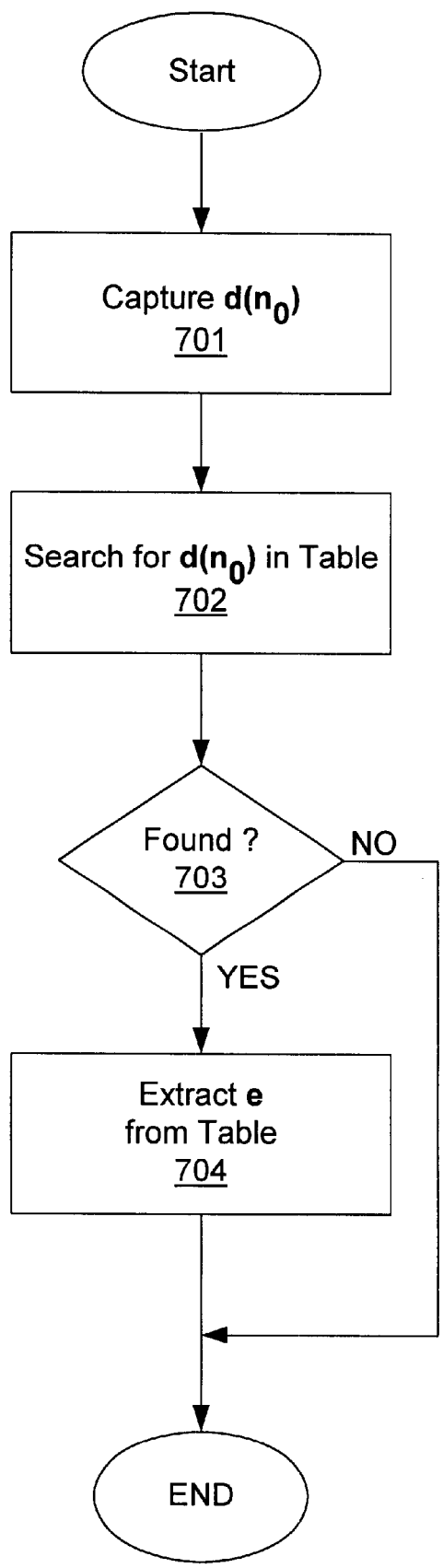
FIG. 7 is a flowchart describing an alternate mode of operation of the correction algorithm in the inventive system of FIG. 5.

Clearly, if the number of data vectors $d(n_0)$ leading to significant amplitude swings is relatively small, then applying the algorithm of FIG. 7 leads to significant computational savings, as very little searching and almost no computations are required.

It is to be understood that the present invention is not limited to the use of Walsh-Hadamard transforms or to the spreading of sequences by Walsh codes. In fact, any other orthogonal or pseudo-orthogonal set of codes, such as Gold codes, along with corresponding transforms, can be used instead of the codes and transforms specifically described herein.

Therefore, in view of the many further conceivable variations of the present invention, its scope is only to be limited by the claims appended hereto.

We claim:

1. A system for modifying a plurality of input data streams entering a CDMA forward link having means for spectrally spreading the plurality of input data streams in accordance with a plurality of spreading codes, thereby to produce a respective plurality of spread data streams, and means for combining, modulating and heterodyning the plurality of spread data streams, thereby to produce a composite signal having a dynamic range, the system comprising:

means for computing a plurality of correction factors from the plurality of input data streams; and means for varying the input data streams in accordance with the correction factors;

wherein the correction factors take on values that limit the dynamic range of the composite signal.

2. A system according to claim 1, wherein the means for varying consists of a plurality of delay elements for respectively delaying the input data streams and producing a respective plurality of delayed data streams, and a plurality of summers respectively connected to the delay elements, for adding a respective one of the plurality of correction factors to each delayed data stream; and wherein the means for computing consists of a processor for storing the instantaneous values of the input data streams and generating the plurality of correction factors therefrom.

3. A system according to claim 1, wherein the means for varying consists of a plurality of delay elements for respectively delaying the input data streams and producing a respective plurality of delayed data streams, and a plurality of multipliers respectively connected to the delay elements, for multiplying each delayed data stream by a respective one of the plurality of correction factors; and wherein the means for computing consists of a processor for storing the instantaneous values of the input data streams and generating the plurality of correction factors therefrom.

4. The system of claim 2, wherein the processor generates the plurality of correction factors by:

applying a transform to said instantaneous values, thereby to produce a first time sequence;

applying a distortion model to the first time sequence, thereby to produce a second time sequence;

inversely applying said transform to the second time sequence, thereby to produce distorted instantaneous values; and setting each correction factor to a value that is a function of the difference between the respective instantaneous and distorted instantaneous values.

5. The system of claim 2, wherein selected ones of the input data streams are associated with traffic channels, such streams being traffic data streams, and wherein the processor generates the plurality of correction factors by:

applying a transform to said instantaneous values, thereby to produce a first time sequence;

applying a distortion model to the first time sequence, thereby to produce a second time sequence;

inversely applying said transform to the second time sequence, thereby to produce distorted instantaneous values;

respectively subtracting the distorted instantaneous values from the instantaneous values, thereby to produce an intermediate correction vector;

setting the correction factors associated with the traffic data streams to corresponding elements of the intermediate correction vector;

and setting the correction factors not associated with the traffic data streams to respective default values.

6. The system of claim 2, wherein the processor generates the plurality of correction factors by:

applying a transform to said instantaneous values, thereby to produce a first time sequence;

applying a distortion model to the first time sequence, thereby to produce a second time sequence;

inversely applying said transform to the second time sequence, thereby to produce distorted instantaneous values;

respectively subtracting the distorted instantaneous values from the instantaneous values, thereby to produce an intermediate correction vector;

for each element of the intermediate correction vector, setting the corresponding correction factor equal to said element if said element exceeds a predetermined threshold level; otherwise, setting the corresponding correction factor to a respective default value.

7. The system of claim 2, wherein the processor generates the plurality of correction factors by:

collectively comparing said instantaneous values to a plurality of table entries, each table entry corresponding to a collection of instantaneous values that gives rise to high amplitude variations of the composite signal and being associated with a set of correction factors;

if the instantaneous values collectively match one of the plurality of table entries, extracting from said table the set of correction factors corresponding to said table entry; otherwise setting the correction factors to respective default values.

8. The system of claim 3, wherein the processor generates the plurality of correction factors by:

collectively comparing said instantaneous values to a plurality of table entries, each table entry corresponding to a collection of instantaneous values that gives rise to high amplitude variations of the composite signal and being associated with a set of correction factors;

if the instantaneous values collectively match one of the plurality of table entries, extracting from said table the set of correction factors corresponding to said table entry; otherwise setting the correction factors to respective default values.

9. The system of claim 1, wherein selected ones of the input data streams carry vocoded speech from respective users.

10. The system of claim 1, wherein selected ones of the input data streams carry convolutionally encoded vocoded speech from respective users.

11. The system of claim 4, wherein said transform is the Walsh-Hadamard transform.

12. The system of claim 5, wherein said transform is the Walsh-Hadamard transform.

13. The system of claim 6, wherein said transform is the Walsh-Hadamard transform.

14. The system of claim 4, wherein the distortion model is an input-output curve having a shape formed by a combination of odd powers of the input.

15. The system of claim 5, wherein the distortion model is an input-output curve having a shape formed by a combination of odd powers of the input.

16. The system of claim 6, wherein the distortion model is an input-output curve having a shape formed by a combination of odd powers of the input.

17. The system of claim 1, wherein the correction factors are calculated within a symbol period of approximately 52 microseconds.

18. A system for producing a composite signal from a plurality of input data streams, the composite signal having a dynamic range, the system comprising:

means for varying the input data streams in accordance with a plurality of correction factors and producing a respective plurality of modified data streams;

means for spectrally spreading the plurality of modified data streams in accordance with a plurality of spreading codes, thereby to produce a respective plurality of spread data streams;

means for modulating, heterodyning and combining the plurality of spread data streams, thereby to produce the composite signal; and means for computing the plurality of correction factors from the plurality of input data streams, wherein the correction factors take on values that limit the dynamic range of the composite signal.

19. A system according to claim 18, wherein the means for varying consists of a plurality of delay elements for respectively delaying the input data streams and producing a respective plurality of delayed data streams, and a plurality of summers respectively connected to the delay elements, for adding a respective one of the plurality of correction factors to each delayed data stream; and wherein the means for computing consists of a processor for storing the instantaneous values of the input data streams and generating the plurality of correction factors therefrom.

20. A system according to claim 18, wherein the means for varying consists of a plurality of delay elements for respectively delaying the input data streams and producing a respective plurality of delayed data streams, and a plurality of multipliers respectively connected to the delay elements, for multiplying each delayed data stream by a respective one of the plurality of correction factors; and wherein the means for computing consists of a processor for storing the instantaneous values of the input data streams and generating the plurality of correction factors therefrom.

21. The system of claim 19, wherein the processor generates the plurality of correction factors by:

applying a transform to said instantaneous values, thereby to produce a first time sequence;

applying a distortion model to the first time sequence, thereby to produce a second time sequence;

inversely applying said transform to the second time sequence, thereby to produce distorted instantaneous values; and setting each correction factor to a value that is a function of the difference between the respective instantaneous and distorted instantaneous values.

22. The system of claim 19, wherein selected ones of the input data streams are associated with traffic channels, such streams being traffic data streams, and wherein the processor generates the plurality of correction factors by:

applying a transform to said instantaneous values, thereby to produce a first time sequence;

applying a distortion model to the first time sequence, thereby to produce a second time sequence;

inversely applying said transform to the second time sequence, thereby to produce distorted instantaneous values;

respectively subtracting the distorted instantaneous values from the instantaneous values, thereby to produce an intermediate correction vector;

setting the correction factors associated with the traffic data streams to corresponding elements of the intermediate correction vector; and setting the correction factors not associated with the traffic data streams to respective default values.

23. The system of claim 19, wherein the processor generates the plurality of correction factors by:

applying a transform to said instantaneous values, thereby to produce a first time sequence;

applying a distortion model to the first time sequence, thereby to produce a second time sequence;

inversely applying said transform to the second time sequence, thereby to produce distorted instantaneous values;

respectively subtracting the distorted instantaneous values from the instantaneous values, thereby to produce an intermediate correction vector;

for each element of the intermediate correction vector, setting the corresponding correction factor equal to said element if said element exceeds a predetermined threshold level; otherwise, setting the corresponding correction factor to a respective default value.

24. The system of claim 19, wherein the processor generates the plurality of correction factors by:

collectively comparing said instantaneous values to a plurality of table entries, each table entry corresponding to a collection of instantaneous values that gives rise to high amplitude variations of the composite signal and being associated with a set of correction factors;

if the instantaneous values collectively match one of the plurality of table entries, extracting from said table the set of correction factors corresponding to said table entry; otherwise, setting the correction factors to respective default values.

25. The system of claim 20, wherein the processor generates the plurality of correction factors by:

collectively comparing said instantaneous values to a plurality of table entries, each table entry corresponding to a collection of instantaneous values that gives rise to high amplitude variations of the composite signal and being associated with a set of correction factors;

if the instantaneous values collectively match one of the plurality of table entries, extracting from said table the set of correction factors corresponding to said table entry; otherwise, setting the correction factors to respective default values.

26. The system of claim 18, wherein the spreading codes are mutually orthogonal binary sequences.

27. The system of claim 18, wherein the spreading codes are Walsh codes.

28. The system of claim 18, wherein the input data streams, correction factors and modified data streams have a common first data rate and the spreading codes and spread data streams have a common second data rate inferior to the first data rate.

29. The system of claim 28, wherein the first data rate is 19.2 kilobits per second and the second data rate is 1228.8 kilobits per second.

30. The system of claim 18, further comprising:

a digital-to-analog converter connected to the modulation means, for converting the composite signal into an analog signal.

31. The system of claim 30, further comprising:

a power amplifier connected to the digital-to-analog converter for amplifying the analog signal and producing an amplified analog signal.

32. The system of claim 31, further comprising:

an antenna connected to the power amplifier, for converting the amplified analog signal into a radio frequency signal.

33. The system of claim 32, wherein the system is a forward-link CDMA transmission system in accordance with the IS-95A standard.

34. A method of modifying a plurality of input data streams entering a CDMA forward link having means for spectrally spreading the plurality of input data streams in accordance with a plurality of spreading codes, thereby to produce a respective plurality of spread data streams, and means for combining, modulating and heterodyning the plurality of spread data streams, thereby to produce a composite signal having a dynamic range, the method comprising the steps of:

computing a plurality of correction factors from the plurality of input data streams; and varying the input data streams in accordance with the correction factors;

wherein the correction factors take on values that limit the dynamic range of the composite signal.

35. A method for producing a composite signal from a plurality of input data streams, the composite signal having a dynamic range, the method comprising the steps of:

varying the input data streams in accordance with a plurality of correction factors and producing a respective plurality of modified data streams;

spectrally spreading the plurality of modified data streams in accordance with a plurality of spreading codes, thereby to produce a respective plurality of spread data streams;

modulating, heterodyning and combining the plurality of spread data streams, thereby to produce the composite signal; and computing the plurality of correction factors from the plurality of input data streams, wherein the correction factors take on values that limit the dynamic range of the composite signal.

36. A computer-readable storage medium containing software that, when running on a processor, follows a sequence of steps to produce a plurality of correction factors for respectively varying a plurality of input data streams that are fed to a CDMA forward link having means for spectrally spreading the plurality of input data streams in accordance with a plurality of spreading codes, thereby to produce a respective plurality of spread data streams and means for modulating, heterodyning and combining the plurality of spread data streams, thereby to produce a composite signal having a dynamic range, the steps comprising:

periodically storing the instantaneous values of the input data streams;

applying a transform to said instantaneous values, thereby to produce a first time sequence;

applying a distortion model to the first time sequence, thereby to produce a second time sequence;

inversely applying said transform to the second time sequence, thereby to produce distorted instantaneous values; and setting each correction factor to a value that is a function of the difference between the respective instantaneous and distorted instantaneous values;

wherein modification of the input data streams by the correction factors reduces the dynamic range of the composite signal.

37. A computer-readable storage medium containing software that, when running on a processor, follows a sequence of steps to produce a plurality of correction factors for respectively varying a plurality of input data streams that are fed to a CDMA forward link having means for spectrally spreading the plurality of input data streams in accordance with a plurality of spreading codes, thereby to produce a respective plurality of spread data streams and means for modulating, heterodyning and combining the plurality of spread data streams, thereby to produce a composite signal having a dynamic range, the steps comprising:

periodically storing the instantaneous values of the input data streams;

collectively comparing said instantaneous values to a plurality of table entries, each table entry corresponding to a collection of instantaneous values that gives rise to high amplitude variations of the composite signal and being associated with a set of correction factors;

if the instantaneous values collectively match one of the plurality of table entries, extracting from said table the set of correction factors corresponding to said table entry; otherwise setting the correction factors to respective default values.

* * * * *